United States Patent [19]

Evans et al.

[11] Patent Number: 4,477,613
[45] Date of Patent: Oct. 16, 1984

[54] STABILIZATION OF TACKIFYING RESIN DISPERSIONS

[75] Inventors: James M. Evans, Jacksonville; Kenneth E. Krajca; Keijo A. Ukkonen, both of Lynn Haven; James E. Hansen, Panama City, all of Fla.

[73] Assignee: Sylvachem Corporation, Panama City, Fla.

[21] Appl. No.: 519,451

[22] Filed: Aug. 1, 1983

[51] Int. Cl.$^3$ .............................. C09F 1/00; C09F 7/00
[52] U.S. Cl. .................................. 524/77; 260/101; 260/102; 260/105; 524/187; 524/270; 524/272
[58] Field of Search ............... 524/77, 270, 272, 187; 260/101, 102, 105

[56] References Cited

U.S. PATENT DOCUMENTS

| | | | |
|---|---|---|---|
| 3,211,683 | 10/1965 | Arakawa et al. | 524/274 |
| 3,775,146 | 11/1973 | Reckziegel et al. | 524/272 |
| 4,183,834 | 1/1980 | Evans et al. | 260/27 BB |
| 4,289,669 | 9/1981 | Lakshimanan | 524/272 |
| 4,328,141 | 5/1982 | Farewell et al. | 524/272 |
| 4,380,513 | 4/1983 | Ruckel et al. | 260/104 |

*Primary Examiner*—Herbert S. Cockeram
*Attorney, Agent, or Firm*—R. A. Sturges; M. H. Douthitt

[57] ABSTRACT

There is provided a stabilized aqueous base tackifier composition characterized by the presence in an aqueous medium of a resinous tackifier composition having an acid number in the range from 30 to 150 and a softening point in the range of from $-40°$ to $150°$ C., a minor amount of a nonionic or anionic surfactant and a minor amount of an elastomeric latex. There is also provided a method of stabilizing an emulsifiable tackifier composition which comprises adding to such composition, a minor amount of a surfactant and a minor amount of an elastomer.

33 Claims, No Drawings

STABILIZATION OF TACKIFYING RESIN DISPERSIONS

This invention relates as indicated to a method for stabilizing tackifying resin dispersions or emulsions to improve shelf stability.

BACKGROUND OF THE INVENTION AND PRIOR ART

Tackifying resin emulsions, particularly those based on rosin or derivatives thereof, are mainly used in the aqueous base adhesives industry. Typically, these tackifying resin emulsions have been difficult to handle. These emulsions exhibit poor particle size stability, i.e., the emulsion particles tend to coalesce or aggregate into larger particles and the emulsion ultimately breaks into two phases, often in a matter of hours.

A rosin derived tackifying resin typical of the state of the art at this time is that which is described in U.S. Pat. No. 4,183,834 commonly owned with the present application. Tackifying resins of the type therein described are improved in respect of emulsion stability by the present invention. Also disclosed therein are adhesive compositions composed of the tackifier and a relatively large amount of a latex. The present invention is principally concerned with the tackifier composition prior to its blending with an elastomer latex, to form an adhesive composition. It should be understood that although the tackifier composition of this invention contains a small amount of an elastomer, the tackifier composition of the present invention, per se, is not an adhesive composition.

BRIEF STATEMENT OF THE INVENTION

Briefly stated and present invention is in a stabilized resinous tackifier composition characterized by a carboxyl-containing resinous composition having an acid value of from 30 to 150 and a softening point of from −25° C. to 150° C. and being at least partially neutralized with a counter ion capable of carrying the resinous composition into solution or dispersion in water, a surface active agent, and a minor amount of an elastomer effective to stabilize said emulsion. The tackifier compositions hereof may also optionally contain an additional resinous component having an acid value greater than or equal to zero in an amount up to 90% of the total solids of the composition. The invention also contemplates a method of stabilizing an aqueous base resinous tackifier composition which comprises blending (a) a carboxyl-containing resinous composition having an acid value of from 30 to 150 and a softening point of from −25° C. to 150° C., at least partially neutralized with a counter ion capable of carrying the resinous composition into solution or dispersion in water (b) from 0.1% to 5% by weight of the tackifier composition solids of a nonionic or anionic surfactant, and (c) from 3% to 14% by weight of the tackifier composition solids of an elastomer.

DETAILED DESCRIPTION OF THE INVENTION

Rosin and chemical derivatives of rosin are widely used in the adhesives industry. The term "rosin" as used herein means a mixture of abietic acid and pimaric acids which can be obtained from wood. "Resin" refers to a chemical derivative of rosin. Commercially available rosins are wood rosin, gum rosin and tall oil rosin. The chemical derivatives of rosin useful herein are synthesized mainly by grafting, as by Diels-Alder, or cationic addition at rosin double bonds, i.e., by polymerization, hydrogenation, disproportionation, esterification, or a combination of the foregoing organic reactions. The derivatives that are most commercially valuable are the rosin esters. The rosin or rosin derivative must have unreacted carboxyl attached directly or indirectly through one or more intervening atoms to the rosin nucleus.

In general, the stable emulsions of the present invention are prepared by forming a predispersed rosin or resin composition followed by blending with a small amount of a surfactant and a small amount of a latex effective to stabilize the final emulsion. This effective amount is generally in the range of from 5% to 14% by weight of the tackifier solids on a dry solids basis. To emulsify and stabilize the resin composition the following requirements must be met:

(a) The ultimate resin composition must have ionic character, i.e., it must have an acid value or number greater than 0. Resin compositions which exhibit a 0 acid value are also stabilized if a small amount of rosin acids is added into the neutral resin, or if carboxyl groups are grafted onto the resin structure.

(b) The resin composition must be neutralizable with a suitable counter ion either partially or completely. The neutralizing agent, or ionizing agent, may or may not be a readily volatilizable material, e.g., ammonia, or amine, or hydroxyl amine, but may also be a base such as NaOH, KOH or LiOH which carries the resin substrate into solution or dispersion in an aqueous medium to an extent sufficient to disperse, at least temporarily, the resin composition in the aqueous medium. The base may be a mixture of two volatile bases, e.g., ammonia or ammonia with sodium hydroxide, or a mixture of non-volatile bases, e.g., NaOH and KOH.

The resin composition or "rosin salt" or "resin salt" as the case may be, produced according to requirement (b) provides an internal surfactant for the emulsion formed in the emulsification step. The rosin salt may be prepared externally as in the case of rosin amine salts which are commercially available.

The rosin can be used in its essentially monomeric form as derived from conventional rosin processing operations, or it may be subjected to polymerization to produce a rosin polymer or mixture of rosin polymers with or without monomeric rosin. Preferably, tall oil rosin is used for formulating the ionizable rosin or rosin derivative indicated above.

Tall oil rosin resulting from tall oil processing operations consists mainly of rosin acids—fused triple-ring polycyclic tertiary monocarboxylic acids—typified by abietic acid. Other rosin acids found in tall oil rosin include levopimaric acid, neoabietic acid, dehydroabietic acid, tetrahydroabietic acid, pimaric acid, isopimaric acid, and palustric acid with very minor amounts of other related acids also being present. For present purposes tall oil rosin can include any of the various rosin acids typical of tall oil rosin though preferably a mixture of such rosin acids as is normally found in tall oil rosin resulting from tall oil processing operations is used to form the resinous composition of the present invention. Other rosins useful in the present invention include gum rosin and derivatives thereof, wood rosin and derivatives thereof, or even mixtures of rosins, if desired.

Rosin polymer is composed mainly of dimer rosin acid with lesser quantities of higher polymeric rosin acids also being present. Rosin polymer can be made by subjecting rosin (tall oil, wood, gum or mixtures thereof) to a polymerization process in the presence of suitable acid catalysts such as, for example, zinc chloride, tin chloride, boron trifluoride and various boron trifluoride complexes, sulfuric acid, and the like conventional rosin polymerization catalysts. Generally, about 0.1% to 0.2% catalyst by weight of the rosin is used in conventional rosin polymerization processes. Temperatures for the polymerization process normally range from about 100° C. to about 200° C. Bleaching of the rosin can be practiced as is necessary, desirable, or convenient in conventional fashion.

When it is desired to introduce or augment the carboxylic acid content of the base resin, an unsaturated carboxylic acid compound may be grafted or reacted onto the resin, especially where the resins are used in combination with low acid value resins, e.g., those having an acid value less than 30. Also, rosin acids may be added to the resin composition to introduce carboxyl groups. The added carboxylic acid content is conveniently derived from an alpha,beta-ethylenically unsaturated carboxylic acid, preferably a dicarboxylic acid, grafted onto the resin by reaction with the unsaturation contained in the resin. Additionally, one may conduct a conventional Diels-Alder reaction for grafting an unsaturated carboxylic acid onto the resin. The precise nature of the graft of the ionizable moiety onto the resin need not be precisely characterized as it is necessary only that the grafting acid be chemically united with the resin for purposes of the present invention. Representative acids include, for example, fumaric acid and its half ester, maleic acid (including maleic anhydride) and its half ester, acrylic acid, methacrylic acid and related alkyl and aryl acrylic acids, itaconic acid (and anhydride), and oligomers and copolymers of acrylics and vinyls with ethylenically unsaturated acids (e.g., styrene/acrylic acid copolymers, etc.).

Alcohols for forming a carboxylic ester attached to the resin are monoalcohols of $C_1$-$C_{30}$ chain length and preferably a $C_6$-$C_{10}$ chain length, and/or polyols, such as ethylene glycol, glycerol, pentaerythritol, including hydroxyl-bearing equivalents, such as a mono-epoxide or the like. Representative mono-alcohols include, for example, butanol, hexanol, cyclohexanol, octanol, lauryl alcohol, decanol, cetyl alcohol, octadecanol, carnaubyl alcohol, melissyl alcohol optionally with $C_1$-$C_4$ substitution, e.g., 2-ethyl hexanol, butyl cellosolve and the like and mixtures thereof. A presently preferred fatty alcohol for such ester group formation is decanol.

In forming the carboxylic acid ester-modified resin composition, the acid may be grafted onto the resin followed by the addition of the alcohol or polyol to form ester groups; the preformed ester of the grafting acid and alcohol grafted onto the resin; the resin grafting-acid, and alcohol reacted together in situ to form the acid graft and the ester; or the alcohol can be added to the resin followed by the addition of the grafting acid. It should be noted that the ester may be formed from the acid grafted onto rosin; from the carboxyl group of the rosin, or combinations thereof. Of course, one skilled in the art will appreciate that there are numerous modifications to the foregoing reaction procedures which are included within the spirit of this invention.

It should be noted that when any esterification is completed, the resulting resinous composition must contain unreacted carboxyl, i.e., have a positive acid value, desirably above about 30. A preferred resinous composition can be made from 40-85% rosin, 5-20% grafting alpha,beta-unsaturated carboxylic acid, 10-30% mono-alcohol, and optionally 0-10% polyol. Preferred proportions presently are about 65% rosin, 10% grafting acid, 20% mono-alcohol, and 5% polyol (e.g., a glycerol). Typically, about 1-2 equivalents of acid functionality (rosin and grafting acid) per 0.5-1.5% equivalents of hydroxyl functionality is used in making the resinous composition. The precise proportions of a grafting acid and alcohol used to modify the rosin are adjusted so that the ionizable resinous mixture has a softening point of less than about 125° C., advantageously about −25° to 150° C., and preferably about 0°-100° C.; and acid number (A.N.) of between about 30 and 150 and preferably between about 50 and 80. The particular type of rosin, grafting acid, and mono-ol and/or polyol will determine the individual proportions for producing the product as defined herein. Also the ionizable resinous composition can be mixed with various other modified rosins, such as, for example, rosin grafted with various acrylic or vinyl monomers, oligomers, or copolymers; rosin grafted with a carboxylic acid ester of other mono-ols, polyols, polyepoxides, or the like; rosin esters; phenolic modified rosin derivatives; hydrogenated rosin derivatives; disproportionated rosin derivatives; and the like and mixtures thereof.

The ionizing agent for forming the ionizable resinous composition preferably is an amino ionizing agent such as, for example, ammonia, N,N-dimethyl aminoethanol, methyl amine, monoethanolamine, diethanolamine, triethanolamine, triethylamine, NaOH, LiOH, KOH, and the like, or a mixture of two or more thereof. The ionizing agent is volatile for present purposes when it can be removed from the ionizable resinous composition under conditions effective for volatilizing water from a latex adhesive formulation. Such conditions include room temperature evaporation and/or heating to as high as 100° C. for example. Upon volatilization of the volatile ionizing agent from the ionizable resinous composition, the grafted rosin is reconverted into a water insoluble (hydrophobic) form and when used in a latex adhesive formulation provides superior tackifying properties to such formulation.

The proportion of ionizing agent added to the ionizable resinous composition is sufficient for stably dispersing the resinous composition in water and often an amount in excess of this proportion is used. Factors which influence the proportion of ionizing agent used include, for example, acid number of the mixture, weight ratio of mixture to water, softening point of the mixture, and like known factors. Resinous compositions of relatively lower acid number (e.g., A.N. of 30-50) may require substantially full neutralization with a base in order to effect dispersion of the resinous composition in water. Resinous compositions of relatively higher acid number (e.g., A.N. of 115-150) may require only partial neutralization. Resinous compositions of relatively low softening point (typically liquefied) will tend to be more easily dispersed than resinous compositions of relatively higher softening point. Those skilled in the art will appreciate the various methods and factors which must be considered in order effectively and stably to disperse the resinous composition in water, and for forming an aqueous latex adhesive compositions containing the resinous composition as a tackifier therein. In general, for pressure sensitive adhesives, the neutralizing agent is volatile, e.g., ammonia or a low molecular weight amine or alkanolamine. For laminating adhesives, e.g., kraft paper adhesives, it is preferred to use a nonvolatile base, e.g., NaOH or KOH or LiOH.

The novel resinous composition, both in ionizable and ionized form ranges from liquid under ambient conditions, though often it is quite viscous, on up to a brittle solid depending upon the softening point. The inherent viscosity of the dispersion can be controlled in part by varying the degree of ionization in conventional fashion. The resulting resinous composition (ionizable or ionized) can be handled in such form relatively easily and in ionizable form. Low softening point resinous compositions can be dispersed in water for storage and handling with little or no external heating. Resinous compositions with relatively high softening points may require some heating and occasionally cosolvent addition for dispersing in water. Additionally, low softening point resinous compositions may be used to assist in dispersing relatively high softening point resinous compositions in water.

As a second ingredient, a supplemental surfactant is necessarily included in the tackifier emulsion formulations hereof. Generally from 0.1 to 5% by weight of the water-free tackifier composition solids is used. These are preferably nonionic surfactants although anionic surfactants may be used. One surfactant, or a mixture of such surfactants may be used. For most purposes, from 0.5 to 1.5% will suffice and most satisfactory results are secured at a level of 1.0% by weight of surfactant. Nonionic surfactants useful herein are well known per se and any of them can be used alone or in combination as illustrated in the specific examples below. These agents fall generally in one of the following categories: (a) partial esters of polyhydric alcohol with long chain monocarboxylic acids, e.g., glyceryl monooleate, (b) partial and complete esters of water soluble hydroxy alkyl ethers of polyhydric alcohols with long chain monocarboxylic acids; e.g., ethyleneglycol monooleate, (c) ethers of polyhydric alcohols with long chain fatty alcohols, e.g., lauryl alcohol ether of glycerine; (d) short-chain hydroxyalkyl ethers of polyhydric alcohols etherified with long chain fatty alcohols decyl ether of hydroxy ethyl ether of glycerine; (e) long chain alcohols with a plurality of free hydroxyl groups; (f) esters of long chain alcohols with polyhydroxy acids; (g) long chain acetals of polyhydric alcohols; (h) amides formed from long chain amines and polyhydroxy acids; (i) alkylphenol ethylene oxide condensation products, etc.

Anionic surfactants useful herein are characterized by a oil soluble or organophilic group and a salt or soap forming group such as those mentioned above. To this group of well known surfactants belong, among countless others, the alkali metal soaps, e.g., ammonium, ethylamine, sodium or potassium salts of: $C_{10}$–$C_{20}$ aliphatic monocarboxylic acids, e.g., stearic or oleic acids, $C_{10}$–$C_{30}$ aliphatic, cycloaliphatic and mixed aliphatic/cycloaliphatic sulfonic acids, e.g., petroleum sulfonic acids; Turkey red oil, etc., the sulfonated fatty alcohols and fatty alcohol sulfates, e.g., Gardinols, the sulfonaphthenates, the sulfonated alkyl naphthalenes, the sulfosuccinic acid esters, e.g., Aerosol OT, the arylalkyl sulfonates, e.g., Twitchell reagents, the sulfonated amides, sulfonated phenols as well as many other sulfated, phosphated or borated compounds.

The specific nature of the surfactant is not critical. The amount used is broadly from 0.1 up to about 5 parts per 100 parts of the tackifier solids composition. The HLB should be in the range of from 4–25. The surfactant component may be carried into the compositions hereof along with the latex although the amount of a dry solids basis will most often be found to be insufficient and in need of being augmented. The surfactant component has been found helpful as well in improving compatability with the elastomer latex not only in respect of the stabilizing latex addition, but also in the final adhesive composition.

As indicated above, the third component of the tackifier emulsions of the present invention is a small amount (from 3% to 14% of the total tackifier solids on a dry basis) of an elastomeric homopolymer, copolymer or terpolymer. Desirably the elastomer is utilized in the form of a latex. A latex used herein may be the same as the adhesive latex into which the ultimate tackifier composition will be blended, although a difference between the stabilizing latex and the adhesive latex ultimately used in formulating the adhesive composition is well tolerated. For most purposes, we prefer to use emulsion polymerized homopolymeric chloroprene commercially available as Neoprene Latex 115, a carboxylated neoprene having a glass transition temperature of $-40°$ C., 46.5 to 48.5% solids and a pH of 6.7 to 8.0.

The stabilizing elastomers useful herein to form the stabilized tackifier emulsions include, but are not limited to, aqueous dispersions of natural or synthetic rubbers or elastomers, such as natural rubber, styrene-butadiene copolymers (SBR), carboxylated styrene-butadiene copolymers (5% COOH), poly(isoprene), poly(chloroprene), polyurethanes, chlorinated rubber, rubber hydrochloride, polysulfide rubber, acrylonitrile-butadiene copolymer, acrylonitrile-butadiene-styrene terpolymers, butyl rubbers, ethylene-propylene copolymer, ethylene-propylene-cyclopentadiene rubber, polyvinyl chloride, ethylene-vinylacetate, etc. The useful elastomers also include acrylic and methacrylic elastomers, styrene-butadiene-styrene block copolymers. Those elastomers which are in latex form are commercially available and/or reported in the prior art, and any of the available elastomeric latices may be used herein. Certain elastomers are water soluble, e.g., polyvinyl alcohol resins having a molecular weight in the range of 3,000 to 100,000 and have an equivalent effect on the stability of the tackifier emulsions. Such elastomers may be used in replacement of part or all of the latex.

As indicated above, the compositions of the present invention may optionally contain a fourth component in amount up to a very large proportion, e.g., 90% of the total tackifier solids of an additional compatible resinous tackifier component. Although such additional resinous component usually has a low acid value of 0 to 15, it may be higher than 15. Neutralization of such acidity as is present, in whole or in part, can aid in the dispersability of the entire composition. Suitable resinous components include low acid vaue (3 to 20) esters of rosin, fully or partially hydrogenated rosin, polymerized rosin, disproportionated rosin, and carboxylic acid modified rosin particularly the lower alkyl monohydric alcohols and polyhydric alcohol esters, e.g., methanol, glycol, glycerol or pentaerythritol; hydrocarbon resins, e.g., petroleum hydrocarbon resins, e.g., $C_5$–$C_9$ unsaturated hydrocarbon resins; polyterpene resins, e.g., poly(alphapinene resins); etc., and having a softening point in the range of $-25°$ to 150° C. The balance of the tackifier composition hereof contains, or consists essentially of the previously described three components in the proportions indicated therefor and water. The emulsions are of the oil-in-water type.

In preparing the stabilized tackifier emulsions of the present invention, the procedure is first to form a predispersion of the resinous composition in water. The resinous composition is heated 5° to 10° C. above its softening point as determined by the ring and ball method, and the counter ion providing agent or ionizing agent, and surfactant added. A portion of the water is then slowly added to the resulting ionizable resinous composition. If the softening point is above the boiling point of water, plasticizers and/or organic solvents can be used to reduce the softening point, or water addition can be made under pressure. Usually, the temperature of addition of the water is below its boiling point at ordinary conditions of pressure, e.g., 98° C. or less.

The predispersion is then desirably stirred for a period up to about 30 minutes. After thorough mixing, the elastomer stabilizing agent is added. Some increase in viscosity of the emulsion is not unexpected at this point and efficient agitation is needed. The final particle size of the tackifier composition is generally achieved at this point and is generally in the range of about 1 to 10 microns, and usually from 0.5 to 5 microns. Thereafter, additional water is added and the temperature returned to room temperature spontaneously or with forced cooling.

There results a milky white tackifier emulsion especially adapted for use in forming adhesive compositions as described for example in the aforesaid U.S. Pat. No. 4,183,834, and stable against coalescence and separation for a period of at least 3 months and often a period in excess of 12 months.

One of the advantages of using adhesive grade latices to stabilize the tackifier emulsion is that adhesive properties of the final adhesive are not deleteriously affected, and instead are often improved. Also, all of the disadvantages of using large amounts of external surfactants in such adhesives are avoided. The tackifier products hereof have greatly improved shelf stability. There is also indication that these products resist temperatures below freezing quite well.

It becomes convenient to illustrate the foregoing description with specific examples productive of stable tackifier emulsions, it being understood that these examples are for illustrative purposes to those skilled in the art, but are not to be construed as limiting the invention. In these examples, parts and percentages are by weight.

EXAMPLE I

Eighty-five parts of a pentaerythritol ester of tall oil rosin having an A.V. (acid value) of 5-13 and a softening point of 103°-107° C., 10 parts of a partially polymerized rosin having a 95° C. softening point and an A.V. of 160, 0.5 parts of Igepal CO 990, a nonionic nonyl phenoxy polyethylene oxide ethanol having an HLB of 19.0, (Registry No. 9016-45-9), 0.5 parts of Surfynol 465, 2,4,7,9-tetramethyl-5-decyn-4,7-diol ethoxylate, HLB 16 (Registry No. 9014-85-1), and 5 parts of a decyl ester of fumaric acid modified tall oil rosin, were mixed in together. The temperature of the blend was increased to 140° C. A sample of this resinous composition was pulled out and softening point and acid number were evaluated. Softening point was 92° C. (Ring & Ball method) and acid value was 38.

Three parts of N,N-dimethyl aminoethanol were added into the mixture, and 40 parts of water were added when the temperature of the resin was 98° C.

After mixing 15-20 minutes after the water addition, 14 parts (on dry weight basis) of polychloroprene latex (Neoprene 115) were added into the solution. In order to handle the viscosity increase, very efficient agitation is needed. The final particle size of the dispersion is obtained at this stage. The temperature is maintained at 85°-90° C.

Another 40 parts of water was slowly added into the solution while letting the dispersion cool. When the temperature has reached 25° C. the product, a stable milky white emulsion, is ready for use as a tackifier in pressure sensitive adhesives in accordance with the teachings of U.S. Pat. No. 4,183,834.

Example I represents the best mode known to us at this time for making and using the invention hereof.

EXAMPLE II

Example I was followed in all particulars except instead of N,N-dimethyl aminoethanol, potassium hydroxide 3.9 parts was used. The product is a stable tackifier emulsion especially useful for laminate adhesives.

EXAMPLE III

Example I was followed in all particulars except instead of Surfynol 465, Igepal CO 887, a nonylphenoxy polyethylene oxide ethanol having an HLB of 17.2 (Registry No. 9016-45-9) was used. A stable tackifier emulsion was achieved.

EXAMPLE IV

Example I was followed in all particulars except that instead of the pentaethrythritol ester of tall oil rosin therein used, a different pentaerythritol ester having a softening point of 95°-102° C. was used. The softening point of resulting resinous composition was 88° C. A stable tackifier emulsion was obtained.

EXAMPLE V

Example I is followed in all particulars except Pentalyn H, a pentaethritol ester of partially hydrogenated wood rosin having an A.V. of 18 and a softening point of 102°-110° C. (by Hercules drop method), is used. The resulting resinous composition exhibits a softening point of 92° C. A stable tackifier emulsion is obtained.

EXAMPLE VI

Ninety parts of a glycerol ester of tall oil rosin (3:1 mole ratio) having an A.V. of 3-4 and a softening point of 78° to 85° C., and 5 parts of tall oil rosin (A.V. 174) and 5 parts of decyl ester of fumaric acid modified tall oil rosin, 0.5 parts of Igepal CO-990 See (Example I) and Surfynol 485, 2,4,7,9-tetramethyl-5-decyn-4,7-diol ethoxylate, HLB 18, (50:50) were mixed in together; blend was heated to 120° C. and a sample analyzed. The resinous composition exhibited an acid number of 33 and softening point of 75° C. Then 3.0 parts of N,N-dimethyl aminoethanol were mixed in, the temperature cooled down to 90° C., and 40 parts of water were added.

Temperature was held at 90° C. during the addition of 15 parts (on dry weight basis) Neoprene 115 (polychloroprene) latex (46.5 to 48.0% solids, pH 6.7 to 8.), Tg −40° C.). After latex addition, agitation was continued for 20 minutes. The remaining 40 parts of water were added slowly. After cooling the emulsion down to 20°-25° C., the tackifier emulsion product was stable and ready for use as a tackifier in pressure sensitive adhesive compositions as described in the aforesaid U.S. Pat. No. 4,183,834.

EXAMPLE VII

Ninety-five parts of mixed glyceryl-decyl ester of fumaric acid modified tall oil rosin having an A.V. of 50 and a softening point of 60° C. and 5 parts of tall oil rosin (A.V. 174) are substituted for the individual rosin derivatives used in Example VI. Here, the partial glyceryl ester of tall oil rosin is made first, followed by condensation with fumaric acid, or maleic acid, and then esterification with the fatty alcohol is done. Otherwise, the procedure and result is essentially as disclosed in Example VI.

An amount of N,N-dimethyl aminoethanol at least sufficient to neutralize the acid value, in this case, 3.7 parts, are mixed in and the temperature cooled to 75° C. 40 parts of water are added. The temperature is held at 75° C. during the addition of 15 parts on the dry weight basis of Neoprene 115 latex (46.5 to 48.5 solids) pH 6.7 to 8.0, Tg $-40°$ C. After addition of the latex is complete, agitation is continued for 20 to 30 minutes. The remaining 40 parts of water are then added slowly with agitation. After cooling the emulsion to room temperature, the tackifier composition is ready for use as a tackifier in elastomeric latices for making aqueous base pressure sensitive adhesives.

To demonstrate the particle size stability at room temperature, the aqueous tackifier dispersion of this example was submitted to particle size analysis in a light scattering device otherwise known as a Microtrac (Leeds & Northrup). Observations were made at a 6-month interval, the results being summarized as follows:

|  |  |  | Beginning | After 6 Months |
|---|---|---|---|---|
| Specific surface area | CS | = | 4.81 | 4.75 |
| Mean diameter (volume) | MV | = | 2.56 | 2.52 |
| 90th percentile | %90 | = | 5.72 | 5.91 |
| 50th percentile | %50 | = | 1.88 | 1.71 |
| 10th percentile | %10 | = | 0.53 | 0.56 |
| Uncalibrated Sample |  |  |  |  |
| Volume Data | dV | = | 0.4165 | 0.6309 |

The foregoing summary data includes the particle size in microns at the 10th, 50th and 90th percentile points, (i.e., "% smaller than" or "% passing") of the volume distribution, the mean diameter of the volume distribution, the calculated surface area in $m^2/cm^3$ and a value for uncalibrated sample volume (dV).

In this example, remarkable shelf stability is shown over a six month period.

EXAMPLE VIII

Example VI was followed in all particulars and with similar results when the glycerol ester of tall oil rosin was replaced with Staybelite Ester 10, a glycerol ester of partially hydrogenated wood rosin. The resinous composition had a softening point of 72° C. and acid number of 30.

EXAMPLE IX

To illustrate the use of a hydrocarbon derived tackifier composition, Example I is followed in all particulars and with similar results, but instead of pentaerythritol ester of tall oil rosin, a hydrocarbon tackifying resin is used, i.e., an alpha-methyl styrene resin made by Hercules and available under the name "Krystalex". The resin has a softening point of 85° C.

EXAMPLE X

Example I is followed in all particulars and with similar results when pentaerythritol ester of tall oil rosin, is replaced with a poly beta-pinene resin having a softening point of 115° C. is used.

EXAMPLE XI

Example VI was followed in all particulars and with similar results when N,N-dimethyl aminoethanol was replaced with 4 parts triethanolamine.

EXAMPLE XII

Example VI is followed in all particulars and with similar results when N,N-dimethyl aminoethanol is replaced with ammonia, $NH_4OH$, 1.0 part.

EXAMPLE XIII

Example VI was followed in all particulars and with similar results when N,N-dimethyl aminoethanol was replaced with sodium hydroxide NaOH, 0.75 part. The product was useful as a tackifier emulsion for a water base elastomeric latex laminate adhesive.

EXAMPLE XIV

Example VI is followed in all particulars and with similar results when the combination of surfactants was replaced with Tergitol XH, a polyalkylene glycol ether (Registry No. 9003-11-6), (HLB value 25), 1.0 part.

EXAMPLE XV

Example VI was followed in all particulars and with similar results when 3 parts polyvinyl alcohol M.W. 10,000, 85.5-88.7% hydrolyzed and 12 parts carboxylated SBR latex, 50% solids, pH 9.0, Tg $-33°$; were used instead of Neoprene 115 latex.

EXAMPLE XVI

Example VI is followed in all particulars and with similar results when 3 parts polyvinyl alcohol, M.W. 10,000; 85.5-88.7% hydrolyzed and 12 parts and natural rubber latex 62.1% solids, pH 9.8 are used instead of polychloroprene latex (Neoprene 115).

EXAMPLE XVII

Example VI is followed in all particulars and with similar results when 3 parts polyvinyl alcohol, M.W. 10,000; 85.5-88.7% hydrolyzed and 12 parts acrylic latex were used instead of Neoprene Latex 115.

EXAMPLE XVIII

Example VI was followed in all particulars and with similar results when 10 parts of polyvinyl alcohol, M.W. 10,000; 85.5 to 88.7% hydrolyzed (PVA) were used instead of the Neoprene Latex 115. A stable tackifier emulsion was obtained with PVA as a substitute for a latex.

EXAMPLE XIX

A water dispersible tackifying resin 100 parts solids content (See U.S. Pat. No. 4,183,834, Example I) was dispersed in water to 55% solids. The dispersion was allowed to stand overnight. After 12 hours separation of the resin and water phases was observed. This example illustrates the instability of a commercial tackifier emulsion composition which can be stabilized in accordance with this invention by including therein a surfactant and a latex.

What is claimed is:

1. A stabilized aqueous dispersion of a resinous tackifier composition which comprises (a) a carboxyl-containing rosin derived resinous material having an acid value of from 50 to 150 and a softening point of from −25° to 150° C., said carboxyl-containing resinous material containing a counter ion capable of rendering said resinous material soluble or dispersible in water, (b) from 0.1% to 5% by weight of the total solids of said tackifier composition of a nonionic or anionic surfactant, and (c) from 3% to 14% by weight of the total solids of said tackifier composition of an elastomer in the form of a latex.

2. A stabilized aqueous dispersion as defined in claim 1 which is further characterized by the presence therein of (d) up to 90% by weight of the total solids of an additional different resinous tackifier component having an acid value equal to or greater than zero and a softening point in the range of from −25° C. to 150° C.

3. A stabilized aqueous dispersion as defined in claim 2 wherein the additional resinous tackifier component is selected from $C_1$–$C_{30}$ monohydric alcohol esters of rosin, hydrogenated rosin, polymerized rosin, disproportionated rosin and esters of carboxylic acid modified rosin; polyhydric alcohol esters of rosin, hydrogenated rosin, polymerized rosin, disproportionated rosin and esters of carboxylic acid modified rosin; petroleum hydrocarbon resins, and polyterpene resins.

4. A stabilized aqueous dispersion as defined in claim 1 wherein the resinous material is derived from a polymerized rosin.

5. A stabilized aqueous dispersion as defined in claim 1 wherein the resinous material is derived from hydrogenated rosin.

6. A stabilized aqueous dispersion as defined in claim 1 wherein the resinous material is derived from disproportionated rosin.

7. A stabilized aqueous dispersion as defined in claim 1 wherein the resinous material is derived from a polyhydric alcohol ester of rosin.

8. A stabilized aqueous dispersion as defined in claim 1 wherein the carboxyl-containing resinous material is the reaction product of a rosin, an alpha,beta-unsaturated carboxylic acid and a $C_1$–$C_{30}$ monohydric alcohol.

9. A stabilized aqueous dispersion as defined in claim 8 wherein the alpha,beta-unsaturated carboxylic acid is a dicarboxylic acid.

10. A stabilized aqueous dispersion as defined in claim 8 wherein the alpha,beta-unsaturated carboxylic acid is maleic acid or maleic anhydride.

11. A stabilized aqueous dispersion as defined in claim 8 wherein the alpha,beta-unsaturated carboxylic acid is fumaric acid.

12. A stabilized aqueous dispersion as defined in claim 8 wherein the alcohol is decyl alcohol.

13. A stabilized aqueous dispersion as defined in claim 8 wherein the alcohol is octadecyl alcohol.

14. A stabilized aqueous dispersion as defined in claim 8 wherein the resinous material is the reaction product of tall oil rosin, the alpha,beta-unsaturated carboxylic acid is maleic acid, and the alcohol is decyl alcohol.

15. A stabilized aqueous dispersion as defined in claim 2 wherein the resinous material contains as an additional resinous tackifier component a polyhydric alcohol ester of tall oil rosin.

16. A stabilized aqueous dispersion as defined in claim 15 wherein the polyhydric alcohol is pentaerythritol and the ester has an acid value of 5–13 and a softening point of 95°–107° C.

17. A stabilized aqueous dispersion as defined in claim 15 wherein the polyhydric alcohol is glycerol and the ester has an acid value of 3–4 and a softening point of 78°–85° C.

18. A stabilized aqueous dispersion as defined in claim 1 wherein the resinous material is the reaction product of from 40–85% by weight of a rosin, 5–20% by weight of an alpha,beta-unsaturated carboxylic acid, 10–30% by weight of a $C_1$–$C_{30}$ mono-alcohol and from 0–10% by weight of a polyhydric alcohol.

19. A stabilized aqueous dispersion as defined in claim 1 wherein the counter ion is derived from a volatile ionizing agent.

20. A stabilized aqueous dispersion as defined in claim 19 wherein the volatile ionizing agent is an aminoalcohol.

21. A stabilized aqueous dispersion as defined in claim 20 wherein the aminoalcohol is N,N-dimethyl aminoethanol.

22. A stabilized aqueous dispersion as defined in claim 1 wherein the counter ion is derived from a water soluble base.

23. A stabilized aqueous dispersion as defined in claim 22 wherein the water soluble base is selected from ammonium hydroxide, sodium hydroxide, potassium hydroxide and lithium hydroxide.

24. A stabilized aqueous dispersion as defined in claim 1 wherein the nonionic surfactant is a alkyl phenoxy-poly(ethylene oxide) ethanol having an HLB in the range of 4 to 25.

25. A stabilized aqueous dispersion as defined in claim 24 wherein the alkylphenoxy-poly(ethyleneoxide) ethanol is a nonylphenoxy-poly(ethylene oxide) ethanol.

26. A stabilized aqueous dispersion as defined in claim 1 wherein the nonionic surfactant is a 2,4,7,9-tetramethyl-5-decyn-4,7-diol ethoxylate having an HLB in the range of 4 to 25.

27. A stabilized aqueous dispersion as defined in claim 1 wherein the elastomer is a carboxylated polychloroprene.

28. A stabilized aqueous dispersion as defined in claim 1 wherein (a) the resinous material contains a mixture of (1) 85 parts of a pentaerythritol ester of tall oil rosin having an acid value of 5–13 and a softening point of 103°–107° C., (2) 10 parts of a partially polymerized rosin having a softening point of 95° C. and an acid value of 160 and 5 parts of the decyl ester of fumaric acid modified tall oil rosin; the counter ion is derived from 2-methyl aminoethanol; (b) the surfactant is a mixture of a nonylphenoxy-poly(ethylene oxide) ethanol having an HLB of 19 and a 2,4,7,9-tetra-methyl-5-decyn-4,7-diol ethoxylate having an HLB of 16; and (c) the elastomer is a carboxylated neoprene having a Tg of −40° C., contains from 46.5 to 48.5% solids and has a pH of 6.7 to 8.0.

29. A stabilized aqueous dispersion as defined in claim 1 wherein (a) the resinous material is the reaction product of from 40% to 85% by weight of tall oil rosin, from 5% to 20% by weight of a dicarboxylic acid selected from maleic acid, maleic acid anhydride and fumaric acid, from 10% to 30% by weight of decyl alcohol and from 0 to 10% by weight of glycerol, and the counter ion is derived from N,N-dimethyl aminoethanol; (b) the surfactant is a nonionic surfactant having an HLB in the range of 4 to 25; and (c) the elastomer is a carboxylated rubber containing 40% to 60% solids in the form of a latex.

30. A stabilized aqueous dispersion as defined in claim 1 wherein the elastomer is polyvinyl alcohol having a molecular weight in the range of 3,000 to 100,000.

31. A stabilized aqueous dispersion as defined in claim 1 wherein the latex comprises natural rubber latex.

32. A stabilized aqueous dispersion as defined in claim 1 wherein the latex comprises a carboxylated styrene-butadiene latex.

33. A method of stabilizing an aqueous base resinous tackifier composition which comprises blending (a) a carboxyl-containing resinous composition having an acid value of from 30 to 150 and a softening point of from $-25°$ C. to $150°$ C., at least partially neutralized with a counter ion capable of carrying the resinous composition into solution or dispersion in water, (b) from 0.1% to 5% by weight of the tackifier composition solids of a nonionic or anionic surfactant, and (c) from 3% to 14% by weight of the tackifier composition solids of an elastomer in the form of a latex.

* * * * *